3,280,207
CHEMICAL PROCESS AND CATALYST THEREFOR

Alfonso Maria Liquori, Palazzo Arcate, Naples, Italy, assignor to Colgate-Palmolive Company, New York, N.Y., a corporation of Delaware
No Drawing. Filed Feb. 6, 1963, Ser. No. 256,555
5 Claims. (Cl. 260—675.5)

This invention has to do with a process for converting hydrocarbons to more valuable products and to new catalysts therefor. More particularly, it relates to a catalytic process for converting relatively inexpensive hydrocarbons to 3-p-menthene and to p-cymene and to new nickel oxide-molybdenum oxide catalysts.

As is known in the art, 3-p-menthene occurs in nature in very small amounts in the oil of "pittosporum resiniferum." It is also produced synthetically by dehydrating menthols, by cracking menthyl acetate (together with 2-p-menthene), and by isomerization of carvomenthene. All such synthetic methods are expensive.

Several essential oils contain p-cymene. The latter has been prepared synthetically by dehydrating citral, alkylation of toluene, irreversible conversion of terpenes and by other processes. In all such synthetic approaches, p-cymene has been obtained in relatively low yield or in association with substantial amounts of m-cymene. Since p-cymene is today a useful raw material for preparing terephthalic acid for the production of polyester fibres, it is desirable to have a process for producing p-cymene free from the undesirable meta isomer.

One object of this invention is to provide a process for producing 3-p-menthene and p-cymene from relatively inexpensive sources. Another object is to provide a process for producing p-cymene essentially free from m-cymene. Still another object is to provide a novel non-stoichiometric nickel oxide-molybdenum oxide catalyst for this process and useful hydrocarbon processes including aromatization, disproportionation, oligomerization and polymerization. Still another object is to provide a simple and convenient method for preparing the novel catalyst by decomposition of a crystallizable and water-soluble ammonium nickel molybdate $$(NH_4)_6NiMo_9O_{32} \cdot 6H_2O$$

which can be easily prepared and supported on a suitable carrier. Additional objects will appear from the following description of the invention.

The foregoing objects are realized by contacting limonene, dipentene, alpha-pinene or isoprene with a supported transition metal oxide catalyst at a temperature between about 200° C. and about 350° C., whereby a reaction product containing 3-p-menthene and p-cymene is formed.

As indicated, the starting materials of this invention are relatively inexpensive, namely, limonene, dipentene, alphapinene and isoprene. One of the hydrocarbons can be used as the charge, or mixtures of the same can be so used.

Supported transition metal oxide catalysts are used herein to convert the hydrocarbon charge to 3-p-menthene and p-cymene. As used herein, the term "transition metal oxides" connotes oxides of chromium, nickel and molybdenum. The preparation of such catalysts and impregnation of typical catalyst supports with the same are well known in the art and need not be detailed at length. By way of illustration, however, alumina, silica-alumina, clays and the like can serve as supports for the catalysts.

Representative of the oxide catalysts of this invention is a chromium oxide catalyst. Chromium anhydride is incorporated in a carrier such as a 10:90 silica-alumina by impregnation, in conventional manner. The impregnating material is reduced to chromium oxide when heated at 500° C. in a stream of air. In this way, chromium was brought to intermediate valence, with a hexavalent chromium percentage after activation of about 30 to 60 percent. Analysis of hexavalent chromium was carried out by standard iodometric filtration. A typical catalyst is chromium oxide supported on silica-alumina, the chromium content being about 3 percent by weight of the total composition.

To illustrate a molybdenum oxide catalyst, a 10:90 silica-alumina support was impregnated with a solution of ammonium molybdate. Treatment with air at 500° C. provided a substantial percentage of $MoO_3$. Typical of such a catalyst is one having a $MoO_3$ content of about 30 percent by weight.

Representative nickel oxide-molybdenum oxide catalysts are those supported on silica-alumina, with $MoO_3$ content varying from about 8 to about 30 percent by weight and with lesser amounts of nickel oxide.

Particularly preferred herein, however, is an association of nickel oxide and molybdenum oxide, containing from about 8 to about 40 percent by weight of $MoO_3$ and from about 0.4 to about 8 percent by weight of nickel oxide (based upon the weight of the supported catalyst) in which nickel and molybdenum are present in an atomic ratio of 1:9 respectively formed by thermal decomposition of black crystalline soluble complex $$(NH_4)_6NiMo_9O_{32} \cdot 6H_2O$$

at a temperature between about 450° C. and about 550° C., preferably of about 500° C., for 10 to 30 hours, preferably for 20 hours. It is noteworthy that in the aforesaid complex, nickel is present in the unusual tetravalent state.

An X-ray powder diffraction photograph of nickel oxide-molybdenum oxide obtained as indicated above, shows that it is a homogeneous single phase and not a mechanical mixture of the two component oxides. Data from the diffraction photograph are given below in Table I.

TABLE I
[Spacings (d) in A° of different nickel oxides and molybdenum oxides]

| $MoO_3$ [a] | New Catalyst [b] | Mechanical Mixture [c] | NiO [d] |
|---|---|---|---|
| 2.804 W | 2.795 W | 2.804 S | |
| 1.585 S | 1.579 S | 1.605 M | |
| 1.456 M | 1.453 M | 1.469 S | |
| 1.377 VS | 1.371 VS | 1.388 VS | |
| 1.151 M | 1.169 M | 1.152 W | |
| 1.102 W | 1.097 W | 1.106 W | |
| | | | 1.059 S |
| 1.024 S | 1.022 S | 1.027 M | |
| | | .937 W | 0.943 VS |
| .907 W | .904 W | .905 S | |
| .864 W | .862 W | .866 W | |
| .828 M | .827 W | .828 W | |
| 0.806 W | .804 W | .807 M | |
| 0.798 W | .796 W | .798 W | |
| 0.789 W | .787 W | .788 W | |
| 0.780 W | .779 W | .781 W | |
| | | .763 W | .757 VS |
| 0.750 W | .749 W | .749 W | |
| 0.732 W | .734 W | .733 W | |

[a] Molybdenum oxide obtained by decomposing paraammonium molybdate—$(NH_4)_6Mo_7O_{24} \cdot 4H_2O$—at 550° C.
[b] Nickel oxide-molybdenum oxide of this invention; obtained as described above from ammonium nickel molybdate $(NH_4)_6NiMo_9O_{32} \cdot 6H_2O$
[c] Nickel oxide and molybdenum oxide obtained by decomposing a mixture of ammonium para-molybdate and nickel nitrate (9:1, respectively, by weight) at 550° C.
[d] Nickel oxide.
W = weak; M = medium; S = strong; VS = very strong.

The new catalysts contemplated herein can be used in a number of reactions, in addition to converting limonene and other hydrocarbons to 3-p-menthene and p-cymene.

They can be used for disproportionating, aromatizing, oligomerizating, polymerizing, etc. hydrocarbons; that is, for reactions conducted in contact with a transition metal oxide catalyst, as the latter have been defined herein.

Although it is well known that molybdenum catalysts can be activated only by reduction with hydrogen, surprisingly it has been found that nickel oxide-molybdenum oxide catalysts can be activated with air at 500° C. and that such catalysts exhibit a high catalytic activity.

All catalysts contemplated herein are activated with a stream of air at 500° C. for about 10–20 hours.

Conversion of limonene, alpha-pinene or isoprene to 3-p-menthene is effected at temperatures between about 250° C. and about 350° C., preferably between the approximate range of 280° C. and 320° C., and most preferably at about 300° C. Pressure can be atmospheric or autogenic.

The hydrocarbons converted to 3-p-menthene can be contacted with the catalysts described above, in a batch operation such as in a stirring autoclave. They may also be so contacted in a continuous operation wherein the catalyst is in the form of a fixed bed, or in a moving or fluid bed system. The latter are typified by adaptations of the well known TCC and Fluid systems used in the petroleum art. Adaptation is made to accommodate to the temperatures, pressures, space velocities and the like specified herein.

When a continuous operation is used, the range of space velocity is between about 0.1 and about 7 liters per hour of terpene charge per liter of catalyst. The preferred range is from about 0.1 to about 4 liters/hour/liter, and particularly preferred is the approximate range of 0.1–1 liter/hour/liter. When higher space velocities are used, some unreacted hydrocarbon charge is found in the reaction product.

In batch operation, reaction time is from about 1 to about 5 hours, 3 hours being most advantageous for substantially complete conversion of the hydrocarbon charge. In moving bed systems, contact time is between about 0.1 second and 10 seconds; a preferred range is between about 1 and about 5 seconds.

As indicated hereinafter by the illustrative examples, liquid material obtained in the catalytic conversion of limonene, dipentene, alpha-pinene and isoprene, include: cyclomonoolefins, namely, 3-p-menthene and 1-p-menthene; cycloparaffins, particularly, trans-p-menthane; and aromatics, particularly p-cymene. In some cases cycloolefins, such as alpha-terpinene, are formed.

With respect to the use of the new catalysts described above as useful for the production of 3-p-menthene and p-cymene, it is to be understood that they can also be used for the hydrocarbon conversions already mentioned and that the reaction conditions generally employed for such conversions are suitable when the new catalysts are so used.

The invention is illustrated, and not limited by, the following examples. In the examples of disproportionation, aromatization, oligomerization and polymerization reactions, the used nickel oxide-molybdenum oxide catalyst was always activated in an air stream at 500° C. Reaction products were identified by means of Vapor Phase Chromatography and Infra Red Spectrography. The silica-alumina supports were prepared as follows: 125 ml. of sodium silicate (containing 0.365 g. $SiO_2$/ml.), diluted with 400 ml. of water, were cooled at 5° C. and added to a cold solution of 22.4 g. of $Al_2(SO_4)_3 \cdot 18H_2O$ in 70 ml. of water and 33 ml. of HCl 4 N, with strong stirring. A gel was obtained immediately, which was allowed to age for 48 hours. Then it was washed three times for 2 hour periods with a 2% aluminum sulfate solution and with water until free of sulfate ions, dried for 4 hours at 140–160° C. and finally calcinated for 10 hours at about 500° C. At this point it was crushed to give particles with a diameter of about 2–3 mm.

Disproportionation and aromatization reactions of limonene, in continuous and in bath operations, are shown, in Examples 1 through 4.

*Example 1*

30.6 parts by volume of d-limonene (d=0.842) were passed during a 10 minute period through a reactor containing 85 parts by volume of a fixed bed of nickel-molybdenum oxide catalyst (30 percent by weight of $MoO_3$) supported on silica-alumina. The conventional space velocity was 2.16 volume d-limonene/hour/volume of catalyst. Temperature was about 350° C. Reaction products, refrigerated by means of a Liebig condenser, were collected, weighed, and separated preferably in two steps. The first step involved simple distillation to eliminate any products formed by cracking of d-limonene, and the second step involved chromatography on silica gel. In this way, substantially complete separation of 3-p-methene and trans-p-menthane from p-cymene was realized. The presence of trans-p-menthane does not affect the subsequent anti-Markownikoff hydration of 3-p-menthene. Analysis was made with Vapor Phase Chromatography and Infra Red Spectrography apparatuses.

The weight of reaction product was 24 parts, with a total reaction yield of about 93 percent. Distribution of product included:

| | Percent |
|---|---|
| 3-p-menthene | 19 |
| 1-p-menthene | 8 |
| p-Cymene | 65 |

Catalyst was washed wtih 30 parts by volume of cyclohexane and reactivated at 500° C. for 5 hours in an air stream.

The preparation and analysis of the catalyst were as follows. For the preparation of the soluble nickel molybdate with a ratio of Ni/Mo of 1/9, the nickel being in a tetravalent state, 22 milliliters of a 7% $NiSO_4$, 22 milliliters of 30% $(NH_4)_2S_2O_8$ and 50 milliliters of 25% ammonium paramolybdate solution were heated separately at ebullition and then were mixed together. The resulting solution was black in color. A precipitate which formed was then filtered and cooled. Black crystals were separated, washed with cold water and purified by recrystallization from water.

The supported catalyst was prepared by impregnating the carrier, silica-alumina, with an aqueous solution of ammonium nickel molybdate $(NH_4)_6NiMo_9O_{32} \cdot 6H_2O$, in calculated amounts in order to obtain a catalyst containing about the desired percentage of $MoO_3$. This mixture was heated in a water bath until the catalyst was dried. Then it was dried at 200° C. for 5 hours and activated at 500° C. in an air stream for 20 hours in order to obtain the corresponding oxides.

A transition into a lower valence state of molybdenum takes place during the reaction of limonene to 3-p-menthene and p-cymene. The final valence state of molybdenum after one run over the catalyst, was about 5.7 instead of 6. Analysis of the total molybdenum content was carried out by weighing about 0.2 gram of catalyst grounded finely. The catalyst was added to 100 milliliters of $H_2SO_4$ (9 normal) and 5 milliliters of orthophosphoric acid (85%; d=1.71). The resulting mixture was heated for 30 minutes in order to solubilize all of the molybdenum. The solid white residue which formed was filtered and washed several times with hot water. The resulting aqueous solution was dropped slowly through a column containing zinc amalgam, to reduce molybdenum. The column was then washed with 200 milliliters of $H_2SO_4$ (1 normal) and with 100 milliliters of water. The washings were collected in an Erlenmeyer flask containing 30 milliliters of ferric alum (10%) and 4 milliliters of $H_3PO_4$ (85%) and titrated with ceric sulphate (0.1 normal). The final color of the solution should be light yellow. The determination of molybdenum valence after the reaction with limonene was carried out by adding 0.2 gram of catalyst to 25 milliliters of H₂SO₄ (1:1). The resulting mixture was heated for 30 minutes. A solid residue which formed was filtered and was washed with hot water. To the hot water extracts, 25 milliliters of ceric sulphate (0.1 normal) were added. The mixture which formed was allowed to stand at room temperature (22° C.) for four days, being stirred occasionally. This time interval proved sufficiently long for oxidation of molybdenum. Excess ceric ions were determined by filtration with a solution of ferrous salt (0.1 normal), using ortho-phenantroline as an indicator. Color change was from yellow to red.

*Example 2*

24.9 parts by volume of d-limonene were passed during a 92 minute period through a reactor containing a fixed bed of nickel-molybdenum oxides (approximately 8% MoO₃) supported on silica-alumina. Conventional space velocity was 0.27 vol./hour/vol. Temperature was about 300° C. Weight of reaction product was 13 parts. Total reaction yield was about 62 percent, product distribution including:

| | Percent |
|---|---|
| 3-p-menthene | 10 |
| Trans-p-menthane | 12 |
| p-Cymene | 24 |

The amount of 1-p-menthene was practically negligible (0.29%). Almost all cracking products boiling below 100° C. were readily removed by simple distillation.

Catalyst was washed with cyclohexane and reactivated at 500° C. for 10 hours in an air stream.

*Example 3*

37.4 parts by volume of d-limonene were passed during a 52 minute period through a reactor. The latter contained 100 parts by volume of nickel oxide-molybdenum oxide supported on alumina. This catalyst contained about 8.4 percent of MoO₃. The conventional space velocity was 0.43 vol./hour/vol. and the temperature was about 310° C. The weight of the reaction products was 26.5 parts. Total reaction yield was about 84%. Distribution of products included:

| | Percent |
|---|---|
| 3-p-menthene | 7.5 |
| 1-p-menthene | 4.6 |
| Trans-p-menthane | 1.7 |
| p-Cymene | 70 |

The catalyst was washed with cyclohexane and reactivated at 500° C. for 5 hours in air stream. In this case the carrier, alumina, imparted aromatizing characteristics to the catalyst. This is shown by the high yield of p-cymene, shown above.

*Example 4*

In a batch operation, an autoclave containing 10 parts by weight of d-limonene, 8 parts by weight of benzene serving as a solvent, and 0.4 part (weight) of nickel oxide-molybdenum oxide catalyst supported on silica-alumina (powder, 80 mesh), was heated at 200° C. for 3 hours. The catalyst contained about 30 percent of MoO₃. The weight ratio of limonene to catalyst was about 25, while that of limonene to solvent was about 1.1. The total yield of reaction was approximately 85 percent. Reaction products included:

| | Percent |
|---|---|
| 3-p-menthene | 9.3 |
| Trans-p-menthane | 10.4 |
| p-Cymene | 20 |

Higher boiling products comprised about 40 percent. Unreacted limonene was approximately 2 percent.

Oligomerization reactions of isoprene in batch and in continuous operations, are shown in Examples 5 through 8.

*Example 5*

An autoclave was heated at 200° C. for 1 hour while it contained 10 parts by volume of isoprene (d=0.680), 5 parts by volume of cyclohexane (solvent) and 0.2 part by weight of nickel oxide-molybdenum oxide catalyst supported on silica-alumina (powder, 80 mesh). The catalyst contained about 30 percent of MoO₃. The weight ratio of isoprene to catalyst was about 34; the corresponding ratio of limonene to solvent was about 1.7. Total yield of reaction was approximately 50 percent. Reaction products included:

| | Percent |
|---|---|
| Dipentene | 30 |
| Diprene | 22 |

*Example 6*

In this illustration 10 parts by volume of isoprene, 5 parts (volume) of benzene (solvent) and 0.2 part by weight of nickel oxide-molybdenum oxide catalyst supported on silica-alumina (powder, 80 mesh), were heated in an autoclave at 200° C. for 16 hours. The catalyst contained about 30 percent of MoO₃. The total reaction yield was about 60 percent. Primary reaction products were:

| | Percent |
|---|---|
| Dimethyl vinyl cyclohexenes | 17 |
| m-Cymene | 11 |
| p-Cymene | 10.6 |
| Trans-p-menthane | 11.5 |

Dipentene and diprene were completely absent, being disproportionated into p- and m-cymenes and trans-p-menthane. Generally, 3–5 hours are sufficient for obtaining the same products.

*Example 7*

29.4 parts by volume of isoprene were passed during a 45 minute period through a reactor containing 65 parts by volume of nickel oxide-molybdenum oxide catalyst supported on silica-alumina. This catalyst contained about 6.6 percent of MoO₃. The conventional space velocity was about 0.6 vol./hour/vol. Temperature was approximately 300° C. Reaction products comprised 11 parts by weight, of which 4.4 parts by weight were unreacted isoprene. Total reaction yield was approximately 34 percent. Reaction products were:

| | Percent |
|---|---|
| p-Cymene | 8 |
| m-Cymene | 4 |
| 3-p-menthene | 2 |
| Cracking products | 18 |
| Dimethyl vinyl cyclohexenes | 3 |

*Example 8*

29.4 parts by volume of isoprene were passed during a 77 minute interval through a reactor containing 65 parts by volume of the same sample of catalyst mentioned in Example 7. Conventional space velocity was about 0.35 vol./hour/vol. Temperature was approximately 300° C. Reaction products comprised 13 parts by weight; unreacted isoprene was 0.83 part by weight. Total yield of reaction was about 61 percent. The main reaction products were:

| | Percent |
|---|---|
| p-Cymene | 22 |
| m-Cymene | 9.3 |
| 3-p-menthene | 5 |
| Dimethyl vinyl cyclohexenes | 5 |
| Cracking products | 15 |
| High boiling products | 5 |

Polymerization reactions are shown in Examples 9 through 11. In these reactions, nickel oxide-molybdenum oxide catalyst supported on silica-alumina with 6 percent of MoO₃ was used. The catalyst was activated first with a stream of air at 500° C. for 25 hours. It was then reduced either by conventional methods or by passing 15 parts by volume of limonene at 300° C., with a space velocity of 0.5 vol./hour/vol., and finally washed several times with a dry solvent. The final valence state of molybdenum was 4.9.

*Example 9*

An autoclave was charged with 30 parts by volume of dry benzene (solvent), 15 parts (volume) of anhydrous isoprene and 1 part (weight) of the catalyst described immediately above. After the autoclave was so charged, it was washed for 10 minutes with a stream of dry hydrogen free of oxygen in order to eliminate completely all air. It was then heated at 150° C. with stirring under autogenous pressure (about 4 atmospheres) for 15 hours. The autoclave was then allowed to cool to room temperature (about 22° C.), opened and a benzene solution of polymer and high-boiling products (dimers, etc.) was filtered from solids. The polymer was recovered by precipitation of the benzene solution with a volume of methanol ten times larger than that of the benzene solution, and with stirring of the resulting mixture. The solid polyisoprene was filtered, dried and weighed. Two parts by weight of solid polymer were so obtained, i.e., two parts per part by weight of catalyst. Unreacted isoprene was recovered.

*Example 10*

The autoclave was charged with 90 parts by volume of dry benzene (solvent), 45 parts (volume) of anhydrous isoprene, 2 parts (weight) of the catalyst of Example 9, and 0.5 part (weight) of hydroquinone. After charging the autoclave, it was washed for several minutes with a stream of dry hydrogen free of oxygen. It was heated at 150° C. with stirring under autogenous pressure. After about 3 hours, the pressure was 9 atmospheres, and decreased with time until it was 1 atmosphere. After 25 hours, the reactor was allowed to cool to room temperature (about 22° C.), opened and a benzene solution of polymer product so formed was filtered from solids. The polymer was recovered by precipitation of the benzene solution with methanol. The solid polyisoprene was filtered, dried and weighed. The solid polymer comprised 4.1 part (weight), corresponding to 2.1 part per part of catalyst used. Unreacted isoprene was recovered.

*Example 11*

The autoclave was charged with 100 parts by volume of anhydrous xylene and with 1 part (weight) of the catalyst mentioned in Example 9. It was then washed for 10 minutes with a hydrogen stream in order to eliminate air completely, leaving about 3 atmospheres of hydrogen in the reactor. Introduced into the reactor were 60 atmospheres of 98.5 percent of ethylene. The reactor was heated at 230° C. for 25 hours with stirring of the contents. The pressure observed during this period was about 130 atmospheres. The reactor was allowed to cool to room temperature (22° C.), opened and a benzene solution of polymer was filtered from solid. The polymer was recovered by precipitation of the benzene by stirring the latter with 10 volumes of methanol. Solid polyethylene was obtained by filtering the solution and drying it.

I claim:
1. A process for forming 3-p-menthene, which comprises: contacting a terpene selected from the group consisting of limonene and alpha-pinene and mixtures thereof with a supported transition metal oxide catalyst at a temperature between about 200° C. and about 350° C., whereby a reaction product containing 3-p-menthene is obtained.
2. The process of claim 1 wherein the supported transition metal oxide catalyst is molybdenum oxide containing from about 8 to about 40 percent by weight of $MoO_3$.
3. The process of claim 1 wherein the supported transition metal oxide catalyst is chromium oxide containing from about 2 to about 12 percent by weight of chromium.
4. A conversion process comprising contacting a terpene with a supported transition metal oxide catalyst at a temperature between about 200° C. and about 350° C.
5. A process for forming 3-p-menthene and p-cymene, which comprises: contacting a hydrocarbon selected from the group consisting of limonene, alpha pinene and isoprene and mixtures thereof with a catalyst at a temperature between about 200° C. and about 350° C., whereby a reaction product containing 3-p-menthene and p-cymene are obtained, said catalyst comprising an association of nickel oxide and molybdenum oxide supported on a carrier, containing from about 8 to 40 percent by weight of $MoO_3$ and from about 0.4 to about 8 percent by weight of nickel oxide (based upon the weight of supported catalyst), and formed by thermal decomposition of $(NH_4)_6NiMo_9O_{32} \cdot 6H_2O$.

References Cited by the Examiner

UNITED STATES PATENTS

| | | | |
|---|---|---|---|
| 2,486,361 | 10/1949 | Nahin et al. | 252—470 |
| 2,969,348 | 1/1961 | Fawcett | 260—94.9 |
| 2,983,691 | 5/1961 | Richardson | 252—470 |
| 3,037,008 | 5/1962 | Garetson et al. | 260—94.9 |

DELBERT E. GANTZ, *Primary Examiner.*

C. R. DAVIS, *Assistant Examiner.*